(12) United States Patent
Teipel et al.

(10) Patent No.: US 10,968,323 B2
(45) Date of Patent: Apr. 6, 2021

(54) NATURAL FIBER COMPOSITE AND METHOD OF PRODUCTION

(71) Applicants: Blake Teipel, College Station, TX (US); Elisa Teipel, College Station, TX (US); Matt Kirby, College Station, TX (US); Ryan Vano, College Station, TX (US)

(72) Inventors: Blake Teipel, College Station, TX (US); Elisa Teipel, College Station, TX (US); Matt Kirby, College Station, TX (US); Ryan Vano, College Station, TX (US)

(73) Assignee: ESSENTIUM, INC., Pflugerville, TX (US)

(*) Notice: Subject to any disclaimer, the term of this patent is extended or adjusted under 35 U.S.C. 154(b) by 418 days.

(21) Appl. No.: 15/568,216

(22) PCT Filed: Apr. 20, 2016

(86) PCT No.: PCT/US2016/028436
§ 371 (c)(1),
(2) Date: Oct. 20, 2017

(87) PCT Pub. No.: WO2016/172207
PCT Pub. Date: Oct. 27, 2016

(65) Prior Publication Data
US 2018/0148552 A1   May 31, 2018

Related U.S. Application Data

(60) Provisional application No. 62/150,023, filed on Apr. 20, 2015.

(51) Int. Cl.
*C08J 5/04* (2006.01)
*B29C 70/02* (2006.01)
*C08L 23/10* (2006.01)
*C08B 37/00* (2006.01)
(Continued)

(52) U.S. Cl.
CPC ............. *C08J 5/045* (2013.01); *B29C 70/021* (2013.01); *C08B 37/0024* (2013.01); *C08L 23/10* (2013.01); *C08L 51/06* (2013.01); *C08L 97/02* (2013.01); *C08L 2205/02* (2013.01); *C08L 2205/16* (2013.01)

(58) Field of Classification Search
None
See application file for complete search history.

(56) References Cited

U.S. PATENT DOCUMENTS

| 786,496 A | 4/1905 | Horn |
| 6,083,621 A | 7/2000 | Sugimoto |
| 2014/0031493 A1* | 1/2014 | Sasaki ................ C08L 69/00 525/67 |

FOREIGN PATENT DOCUMENTS

| CN | 1161357 A | 10/1997 |
| CN | 107353529 A | 11/2017 |

* cited by examiner

*Primary Examiner* — Monica A Huson
(74) *Attorney, Agent, or Firm* — Vivacqua Crane

(57) ABSTRACT

A reinforced polymer composite includes a polymer matrix, a strengthening agent, and a dispersing agent. The strengthening agent is a natural fiber having an aspect ratio between 6 and 12 and is included in the composite in amounts up to 30 wt %. The dispersing agent is coconut shell powder having an aspect ratio between 1 and 3 and is included in the composite in amounts up to 10 wt %.

30 Claims, 9 Drawing Sheets

(51) Int. Cl.
*C08L 51/06* (2006.01)
*C08L 97/02* (2006.01)

| Sample ID | | | Panelist | | | |
|---|---|---|---|---|---|---|
| | 1 | 2 | 3 | 4 | 5 | Mean* |
| Condition 1, 24h @ RT w/ water | | | | | | |
| A | 2.5 | 3.5 | 2.5 | 1.5 | 3 | 2.5 |
| B | 3 | 2.5 | 2 | 2.5 | 3 | 2.5 |
| Condition 2, 24h @ 40°C w/ water | | | | | | |
| A | 2.5 | 3 | 3.5 | 2 | 3.5 | 3.0 |
| B | 3 | 2 | 3.5 | 2 | 3.5 | 3.0 |
| Condition 3, 2h @ 65°C, dry | | | | | | |
| A | 2.5 | 3 | 3 | 3 | 3.5 | 3.0 |
| B | 2.5 | 3 | 2.5 | 3 | 3.5 | 3.0 |

*Mean values have been rounded to the nearest half point

| 20% Short Glass Fiber Specification for Automotive Interior Applications | | | |
|---|---|---|---|
| | Spec Value | Axium N2025i | Axium N4327i |
| Filler Content | 18-22% Short Glass Fiber | 20% Natural Fiber | 25% Natural Fiber |
| Strategic Optimizing Additive 1 | - | 5% CSP | 2% CSP |
| Strategic Optimizing Additive 2 | - | 1% Solid Phase Grafted MAPP | 1% Solid Phase Grafted MAPP |
| Strategic Optimizing Additive 3 | - | 2% Scrubbing Agent | 2% Scrubbing Agent |
| Density | 1.02-1.08 g/cm3 | 0.99 | 1.01 |
| Tensile strength @ yield | 32 MPa min | 36.0 | 35.9 |
| Tensile Modulus | 2.5 GPa min | 2.81 | 2.81 |
| Flex Modulus | 2.5 GPa min | 2.61 | 2.77 |
| Impact Strength, Notched Izod | Report break type | COMPLETE | HINGE |
| 23C | 2.3 kJ/m2 min | 2.77 | 5.26 |
| FLTM BO 131-03 Odor Test | Rating 3 max | | |
| Condition 1, 24 hrs @ 23°C w/ water | - | 2.5 | 2.5 |
| Condition 2, 24 hrs @ 40°C w/ water | - | 3 | 3 |
| Condition 3, 2 hrs @ 65°C dry | - | 3 | 3 |

FIG. 15

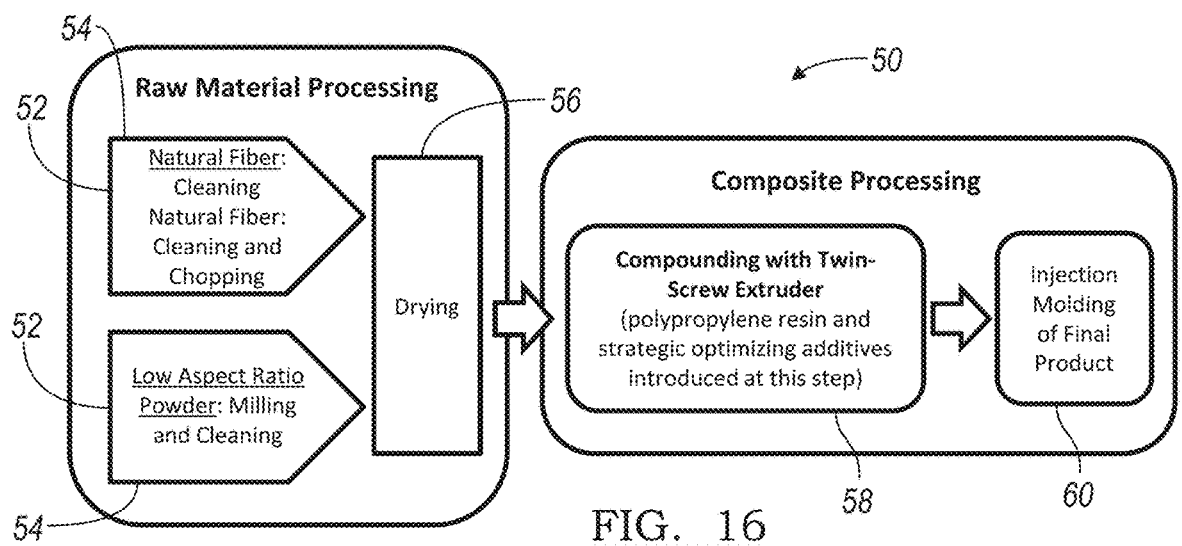

FIG. 16

NATURAL FIBER COMPOSITE AND METHOD OF PRODUCTION

CROSS REFERENCE TO RELATED APPLICATION

This application claims the benefit of International Application No. PCT/US16/28436 filed Apr. 20, 2016 which claims benefit of U.S. Provisional Patent Application Ser. No. 62/150,023, filed Apr. 20, 2015, each of which are hereby incorporated in their entirety herein by reference.

FIELD

The invention relates to polymer composites and more specifically to polymer composites reinforced with natural fibers particularly suitable in applications such as automotive, electronics, construction, and the like.

BACKGROUND

The statements in this section merely provide background information related to the present disclosure and may or may not constitute prior art.

The inclusion of reinforcing fibers in polymer materials, in general, compared to particulate fillers, yields improved tensile strength in the end composite. Reinforcing fibers provide a better opportunity for interfacial bonding which translates to improved load transfer from the polymer matrix to the more rigid filler. The use of reinforcing fibers with a high specific strength is further advantageous because the fiber encourages better load transfer, and the high specific strength of the fiber means that the fiber can bear a larger load.

Glass fibers are typically used as the reinforcing fiber in a polymer matrix composite. However, the manufacture of glass fiber requires 48 MJ/kg which adds to the inefficiencies of the manufacturing process of the composite polymers. Furthermore, the specific gravity of glass fiber is around 2.5 which can result in parts with higher weights especially when part specifications require increased strength thus requiring more glass fiber.

Natural fiber reinforcement has been looked to for replacing glass fibers in polymer composites. Still, there exist many obstacles that have yet to be overcome. Due to the intrinsic challenges associated with extruding and injection molding natural composites, such as moisture, odor, particle wetting and dispersion, and thermal degradation, natural fiber thermoplastic composites, in general, have achieved limited successful breakthrough in thermoplastic composites to date.

The current state of the art of natural fiber composites retains several main deficiencies when compared to glass fiber composites: performance, processability, odor and VOC emissions, and costs. Therefore, there remains room in the art for a natural fiber composite that achieves or exceeds the same processing and performance characteristics as glass fiber composites.

SUMMARY

The present invention provides a reinforced polymer composite including a polymer matrix, a strengthening agent, and a dispersing agent. The strengthening agent includes a natural fiber. The strengthening agent is homogenously dispersed in the polymer matrix.

In another example of the present invention, the natural fiber is a bast fiber included in the reinforced polymer composite in an amount up to about 40.0 wt %.

In yet another example of the present invention, the bast fiber is included in the amount of about 25.0 wt %.

In yet another example of the present invention, the bast fiber is included in the amount of about 20.0 wt %.

In yet another example of the present invention, the dispersing agent is coconut shell powder and is included in the reinforced polymer composite in the amount up to 10.0 wt %.

In yet another example of the present invention, the coconut shell powder is included in the reinforced polymer composite in the amount of about 5.0 wt %.

In yet another example of the present invention, the coconut shell powder is included in the reinforced polymer composite in the amount of about 10.0 wt %.

In yet another example of the present invention, the dispersing agent is coconut shell powder having an aspect ratio between 1 and 3.

In yet another example of the present invention, the natural fiber has an aspect ratio between 6 and 12.

In yet another example of the present invention, the polymer composite material further includes a scrubbing agent in the amount up to 2.0 wt %.

In yet another example of the present invention, the polymer composite material further includes solid phase grafted MAPP in the amount up to 3.0 wt %.

Further features, advantages, and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views. In the drawings:

FIG. 15 shows a specification comparison to 20% short glass fiber for automotive interior application in accordance with the principles of the present invention;

FIG. 16 is a flow chart of a method or process of manufacturing an injection molded part in accordance with the principles of the present invention;

DETAILED DESCRIPTION

The following description is merely exemplary in nature and is not intended to limit the present disclosure, application, or uses.

Figure 1:
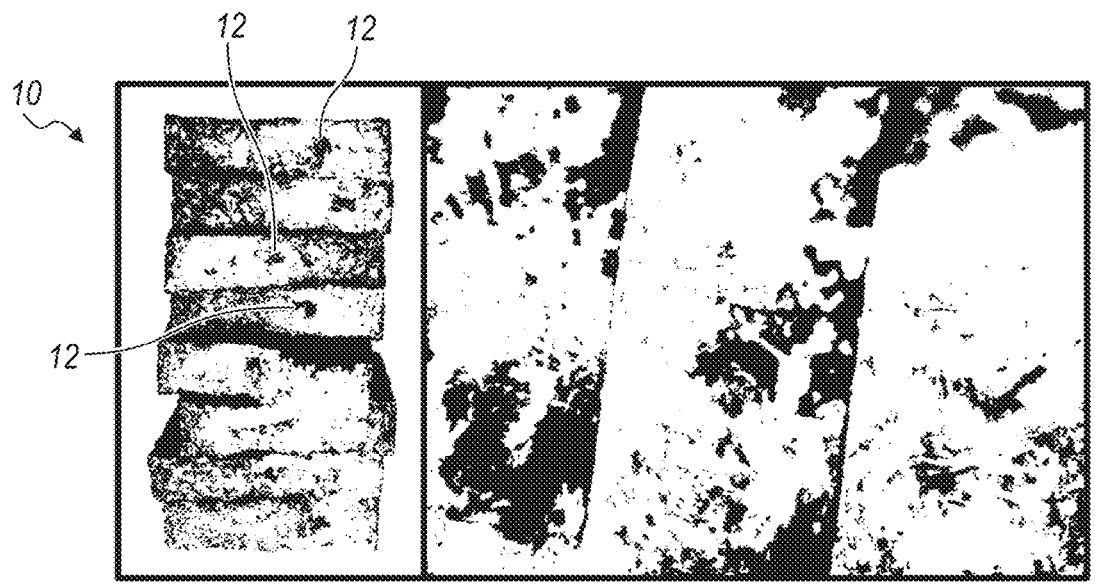
FIG. 1 shows a fracture surface of tensile bars of a 35% natural fiber and polypropylene composite with and without magnification in accordance with the principles of the present invention.

Referring now to FIG. 1, a cross section of the prior art natural fiber composite test bars 10 are shown as created by the current art process and constituents. Fracture surface images of tested tensile bars of a 35% natural fiber—polypropylene composite. A significant challenge in processing natural fillers (hydrophilic) with hydrophobic resins is particle dispersion. The source of this particle dispersion challenge is typically related to surface chemistry, however general dispersion issues can also be related to mechanical entangling. On the surface of most natural fibers, there are hydroxyl groups (—OH), which contribute to the hydrophilic nature of natural fibers and cause hydrogen bonding with other natural fibers that have high aspect ratios. The hydrogen bonding of the natural fibers to one another creates agglomerations 12 in a 35% bast fiber—polypropylene composite. Fiber entangling is also a source of agglomerations. Fiber agglomerations are sections in the composite with a high concentration of natural fibers that are bonded together via hydrogen bonds and/or tangled together, aspect ratio plays a key role in the entanglement as well. These sections appear as dark spots in the FIG. 1 pictures of fracture surfaces. Particle agglomerations act as stress concentrations that reduce composite toughness, impact, and melt flow characteristics. The uneven concentration of fibers at different points in the composite microstructure causes composites to have inconsistent mechanical properties and is evidence of poor particle dispersion.

Figure 2:
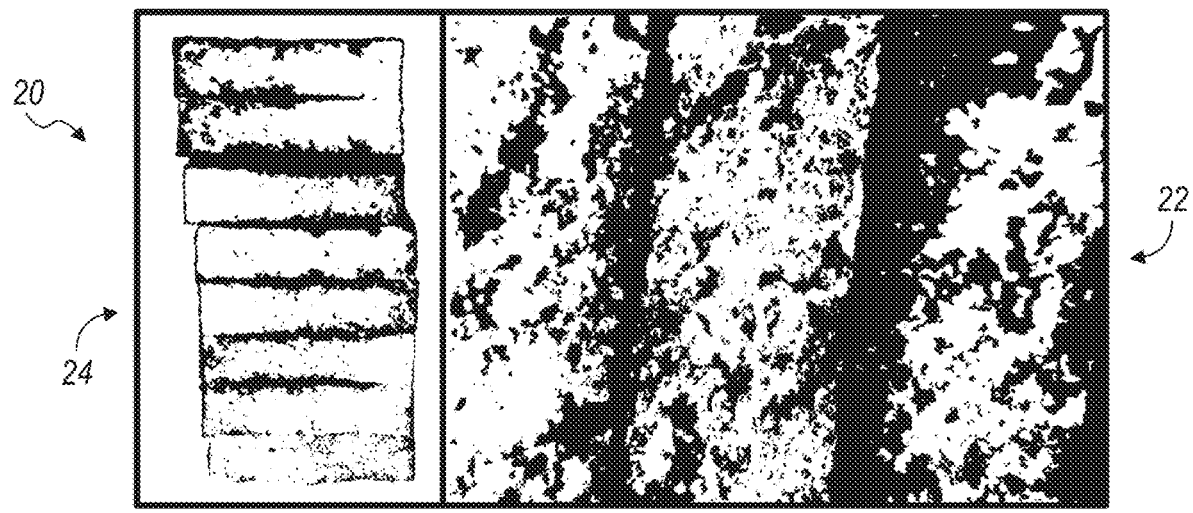
FIG. 2 shows a fracture surface of tensile bars of 25% natural fiber, 10% CSP, and polypropylene composite with and without magnification in accordance with the principles of the present invention.
Figure 3:
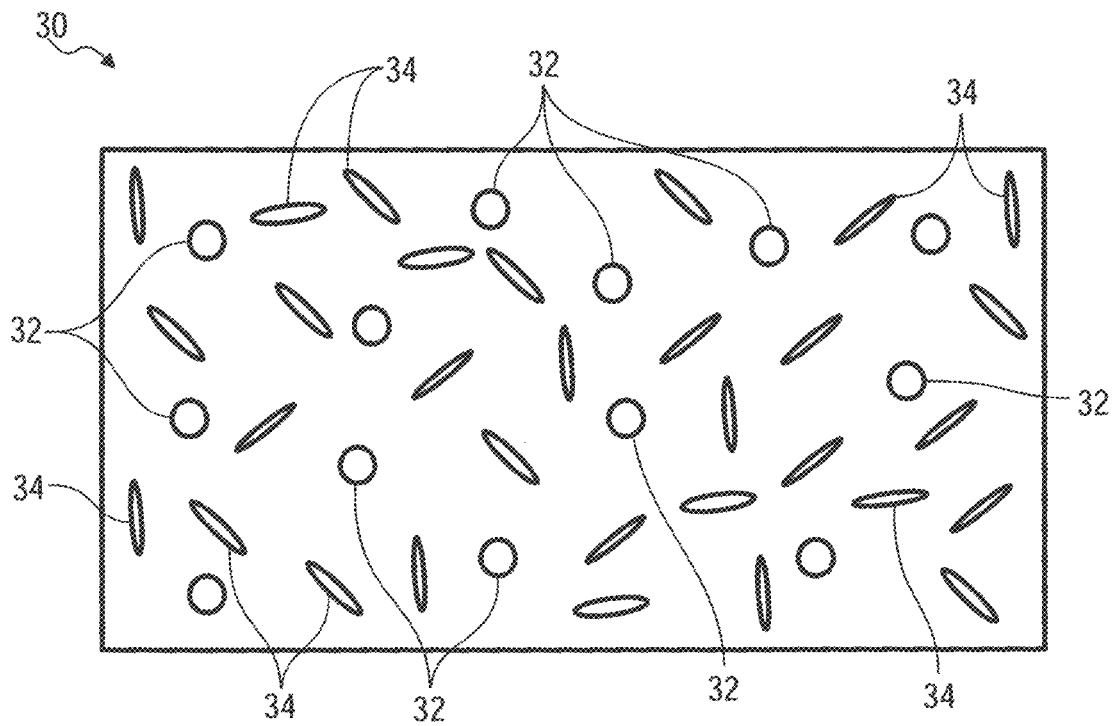
FIG. 3 shows a cross-sectional matrix of a natural fiber composite in accordance with the principles of the present invention.

Referring now to FIGS. 2 and 3, fracture surface images of tested tensile bars 20 of a 25% natural fiber+10% coconut shell powder (CSP)—polypropylene composite are shown along with a depiction of a magnified cross section of the matrix composite 30. One of the primary advantages of using low aspect ratio natural fillers in natural fiber composites is improved fiber dispersion and ease of processing. CSP 32 is one such material used as a dispersing agent and processing agent. CSP 32 is a more spherical particle, having an aspect ratio between 1 and 3, as compared to the high aspect ratio natural fibers 34. CSP 32 low aspect ratio along with its hydrophilic nature helps to breakup fiber agglomerations and prevent them from reforming at all stages of the manufacturing process. During compounding, the CSP 32 is mechanically mixed in with the high aspect ratio natural fibers 34 and the CSP 32 work their way in-between individual fibers. Since CSP 32 is also hydrophilic (having surface hydroxyl groups similar to the hydroxyl groups on the surface of natural fibers), there is an affinity between the high aspect ratio natural fibers 34 and the low aspect ratio CSP 32, which means that once the CSP 32 have been mixed in-between the fibers, they will remain there as a guard against the formation of agglomerations.

The disparity in particle shape and size between natural fibers, and natural particulate fillers, such as CSP, prevents the formation of agglomerations, even in the event that there is hydrogen bonding between the natural particles and the natural fibers. FIG. 2 shows a polypropylene composite with 25 percent natural fiber and 10 percent CSP. Based on the microscope image 22 as well as the picture of the tensile bar fracture surface 24 the particle agglomerations have been significantly diminished by replacing the higher aspect ratio natural fiber with low aspect ratio natural filler. The total natural filler content in FIG. 2 is equivalent to the total natural filler content in FIG. 1.

Figure 4:
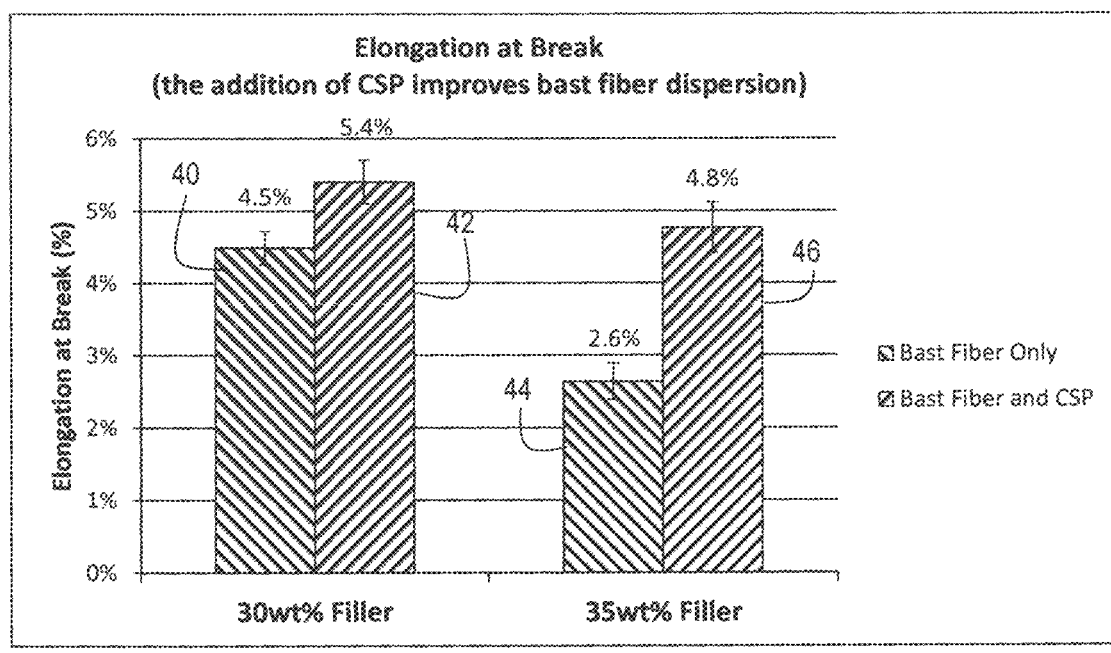
FIG. 4 shows a graph including elongation testing results in accordance with the principles of the present invention.
Figure 5:
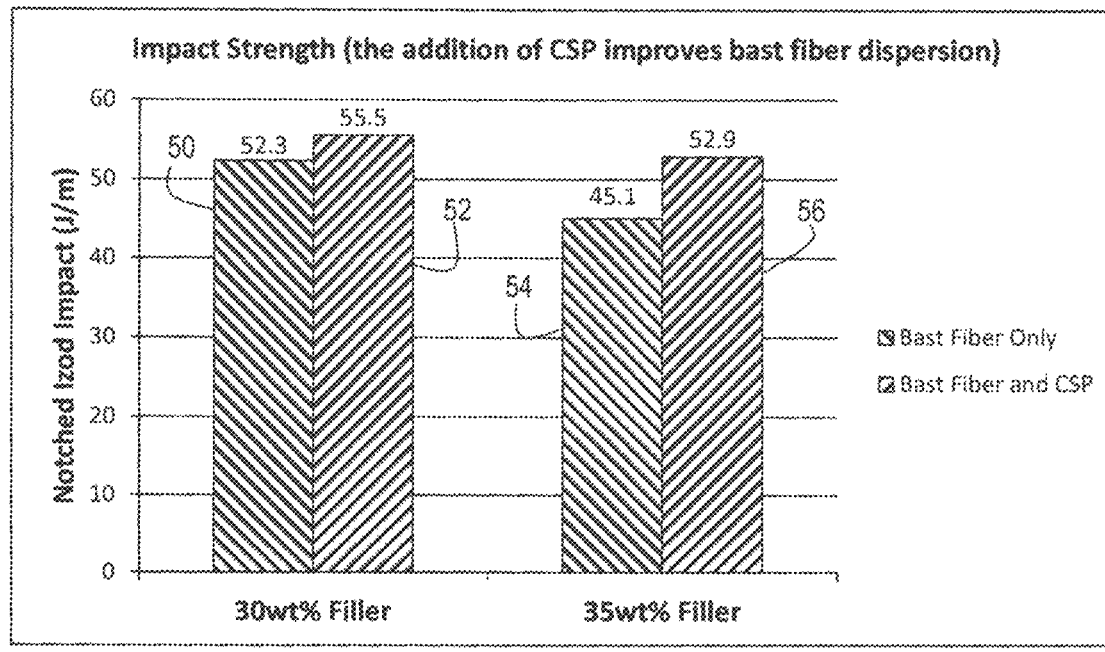
FIG. 5 shows a graph including impact strength testing results in accordance with the principles of the present invention.
Figure 6:
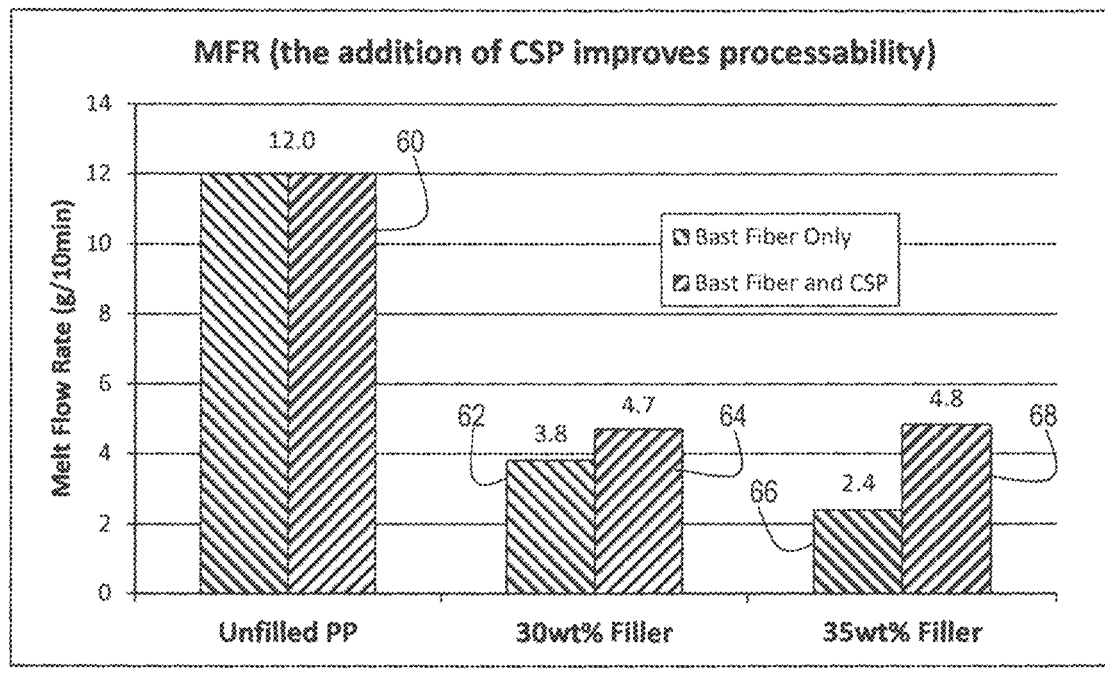
FIG. 6 shows a graph including melt flow rate testing results in accordance with the principles of the present invention.

Turning now to FIGS. 4-6, further evidence of improved particle dispersion and processability when using low aspect ratio natural fillers in high aspect ratio, natural fiber composites can be seen in FIGS. 4-6. FIG. 4 shows elongation at break values for high aspect ratio natural fiber composites and compares those to composites which use low aspect ratio CSP to replace some of the natural fiber. Elongation at break is a mechanical property that is particularly sensitive to particle dispersion and stress concentrations. If particles are not well dispersed and agglomerations are present, the elongation at break value will be reduced because the composite is failing earlier as a result of less energy being required to initiate and propagate cracks. As is shown a first two samples having 30 wt % filler, a first example 40 includes 30 wt % filler with all the filler being bast fiber and a second example 52 includes 25 wt % bast fiber and 5 wt % CSP. The second two samples have 35 wt % filler with the third example 44 including 35 wt % bast fiber and the fourth example including 30 wt % bast fiber and 5 wt % CSP. FIG. 4 continues to affirm that the addition of low aspect ratio fillers increases particles dispersion and decreases fiber agglomerations.

The mechanisms for crack initiation and propagation in elongation at break and Izod impact strength are similar, and both properties are sensitive to stress concentrations and poor particle dispersion. The main difference between these two properties is the speed of fracture. FIG. 5 shows the Izod impact strength for high aspect ratio natural fiber composites with and without the addition of low aspect ratio CSP. The formulations without low aspect ratio CSP were on average lower than the formulations that utilized CSP as a replacement for some of the fiber. As is shown a first two samples of FIG. 5 having 30 wt % filler, a first example 50 includes bast fiber as all of the filler. The second example 52 includes 25 wt % bast fiber and 5 wt % CSP. The second two samples have 35 wt % filler with the third example 54 including 35 wt % bast fiber and the fourth example 56 including 30 wt % bast fiber and 5 wt % CSP. Improvements in particle dispersion are recognized by subsequent improvements in impact strength for the composites that utilize the low aspect ratio, natural filler.

Finally, FIG. 6 points to processability improvements when substituting small amounts of low aspect ratio CSP for high aspect ratio fiber in the fiber composites. FIG. 6 shows melt mass flow rate characteristics for high aspect ratio natural fiber composites with and without low aspect ratio CSP. Higher melt flow rates are better for processing the type of automotive parts that currently utilize glass fibers. Our goal is to improve the melt flow characteristics of natural fiber composites so that they can compete for automotive parts currently occupied by glass fiber composites. There are two primary reasons that replacing natural fiber with CSP improves melt mass flow rate. First, the low aspect ratio of CSP allows the particles to more easily flow than the fibers. Natural fibers more easily entangle with one another as they flow past each other. Therefore, replacing the more easily entangling natural fiber with more easily flowing CSP improves the melt flow rate based on what would be expected from the rule of mixtures. The first two columns of FIG. 6 represent a baseline melt flow rate for unfilled polypropylene (PP) 60. As is shown a first two samples having 30 wt % filler, a first example 62 includes bast fiber as all of the filler. The second example 64 includes 25 wt % bast fiber and 5 wt % CSP. The second two samples have 35 wt % filler with the third example 66 including 35 wt % bast fiber and the fourth example 68 including 30 wt % bast fiber and 5 wt % CSP. However, low aspect ratio CSP also helps to improve the dispersion of the natural fibers in the melt. If the melt flow rate was solely based on the rule of mixtures, with the neat resin (12 MFR), the CSP, and the natural fibers being constituents of the mix then we would expect to see a reduction in the melt flow rate when going from 25 percent natural fiber and 5 percent CSP to 25 percent natural fiber and 10 percent CSP. However, the average melt mass flow rate slightly increases with the addition of low aspect ratio CSP. These melt mass flow rate results along with FIGS. 4 and 5 point to low aspect ratio fillers as processing/dispersion aids in natural fiber composites.

Figure 7:
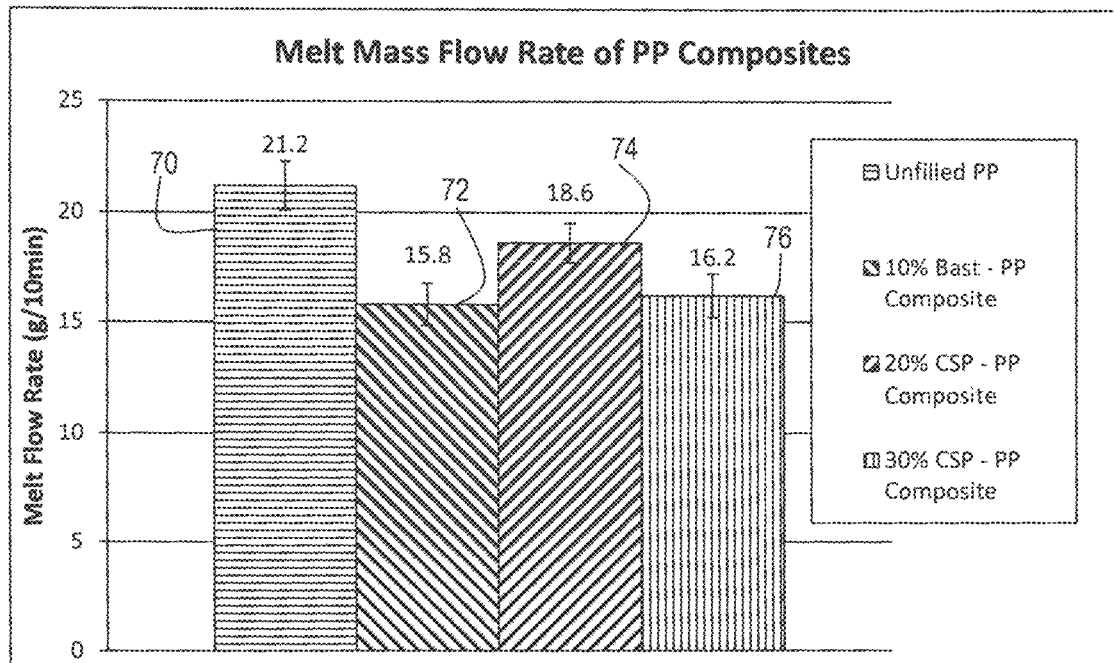
FIG. 7 shows a graph including melt flow rate testing results in accordance with the principles of the present invention.

Referring now to FIG. 7 shows the difference in melt flow rate between 10 percent natural fiber and 20 and 30 percent low aspect ratio CSP in a 20 g/10 min MFR polypropylene copolymer. The first column sample 70 is unfilled polypropylene. The second column 72 represents a sample including 10 wt % bast fiber. The third column 74 represents a sample including 20 wt % CSP with the fourth column representing a sample including 30 wt % CSP. The melt flow rate for natural fiber at 10 wt % loading is lower than the melt flow rate for both 20 and 30 wt % CSP. This graph provides further proof that natural fibers entangle more easily than low aspect ratio fillers and low aspect ratio fillers flow more easily than natural fibers. It is believed that these melt flow characteristics are primary functions of filler geometry.

Figure 8:
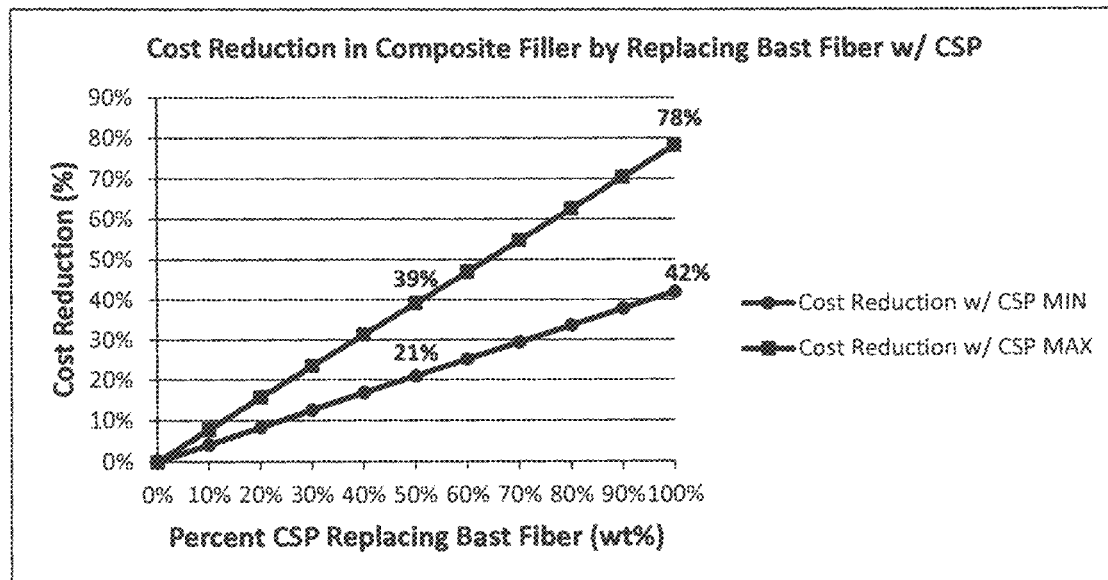
FIG. 8 shows a graph of cost reduction by using CSP in accordance with the principles of the present invention.

Adding small amounts of low aspect ratio natural particles (1-3) to high aspect ratio (6-12) natural fiber composites not only improves processability and fiber dispersion, but it also reduces the cost of the final composite. CSP is sold commercially between 42 and 78 percent less than most natural fibers that have been properly processed for effective commercial manufacturing/extrusion (cleaned, chopped, dried, etc.). FIG. 8 shows the economic advantage of replacing some of the high aspect ratio natural fiber with low aspect ratio CSP. The red trace represents the maximum possible cost reduction available when replacing natural fiber with different percentages of CSP (this is based on the lowest price that CSP could be sold for commercially). The blue trace represents the minimum cost reduction when replacing natural fiber with different percentages of CSP (this is based on the highest price that CSP is sold for commercially). The goal is not to replace 100 percent or even high percentages of the natural fiber with low aspect ratio fillers. Rather, the goal is to utilize the synergy between the two fillers, primarily on the basis of differing filler geometry, to create a natural composite that can compete with glass fiber composites technically and economically.

Figure 9:
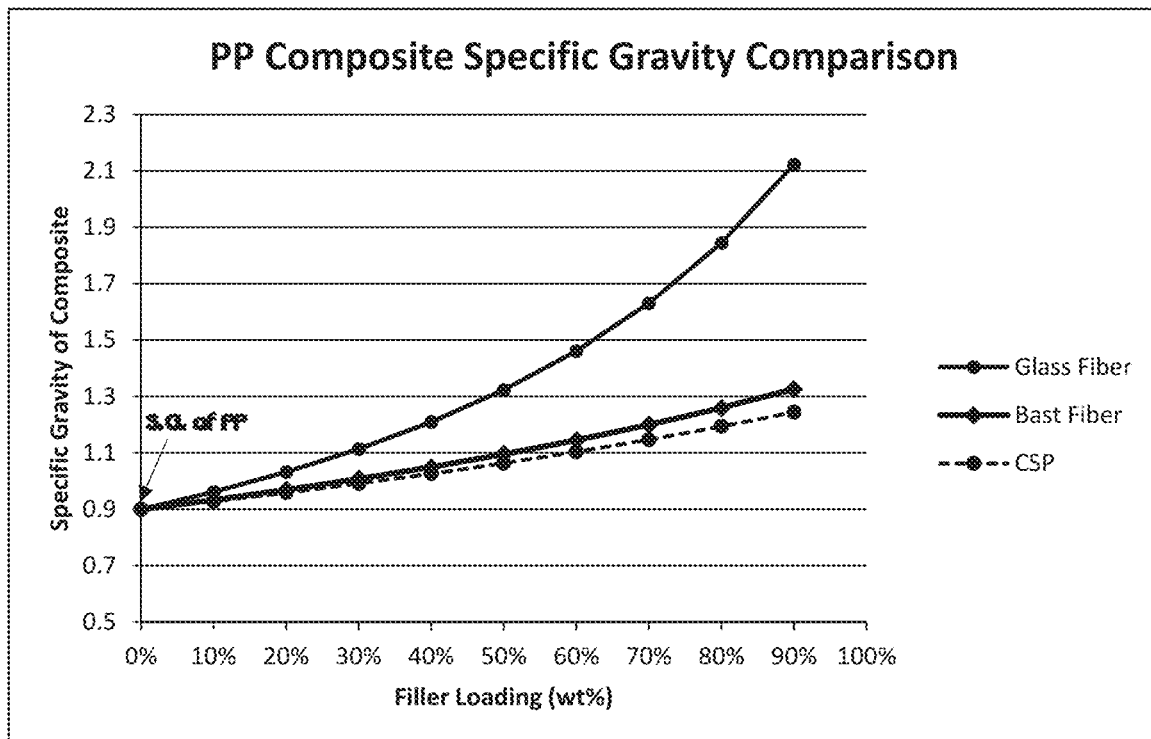
FIG. 9 shows a graph of specific gravity comparison by using CSP in accordance with the principles of the present invention.

The specific gravity of natural fillers compared to glass and other mineral fillers and dispersion aids is a further advantage of using low aspect ratio natural fillers as processing/dispersion aids. For example, CSP has a specific gravity of 1.3 and natural fiber has a specific gravity of 1.4, whereas the glass fiber that we are interested in replacing has a specific gravity of approximately 2.5. Therefore, replacing glass fibers with natural fibers can result in weight savings and using low aspect ratio CSP as a processing/dispersion aid helps to maintain the desired weight savings. FIG. 9 shows the effect of increasing the loading of glass fiber, natural fiber, and CSP on the weight of the composite. Dispersion aids that utilize mineral fillers or more dense particles would increase the weight of the part and reduce the weight savings achieve by using natural fibers as replacement for glass fibers. Low aspect ratio CSP is also advantageous over plasticizers, which are common processing aids. CSP has an advantage over traditional plasticizers because traditional plasticizers reduce composite stiffness due to the short molecular chain length of the plasticizer molecules. Replacing glass fiber in composites requires both high tensile strength and high stiffness. Low aspect ratio particulate fillers, such as CSP, are rigid second phase particles and help to improve composite stiffness, while also improving fiber dispersion and composite processing.

Figure 10:
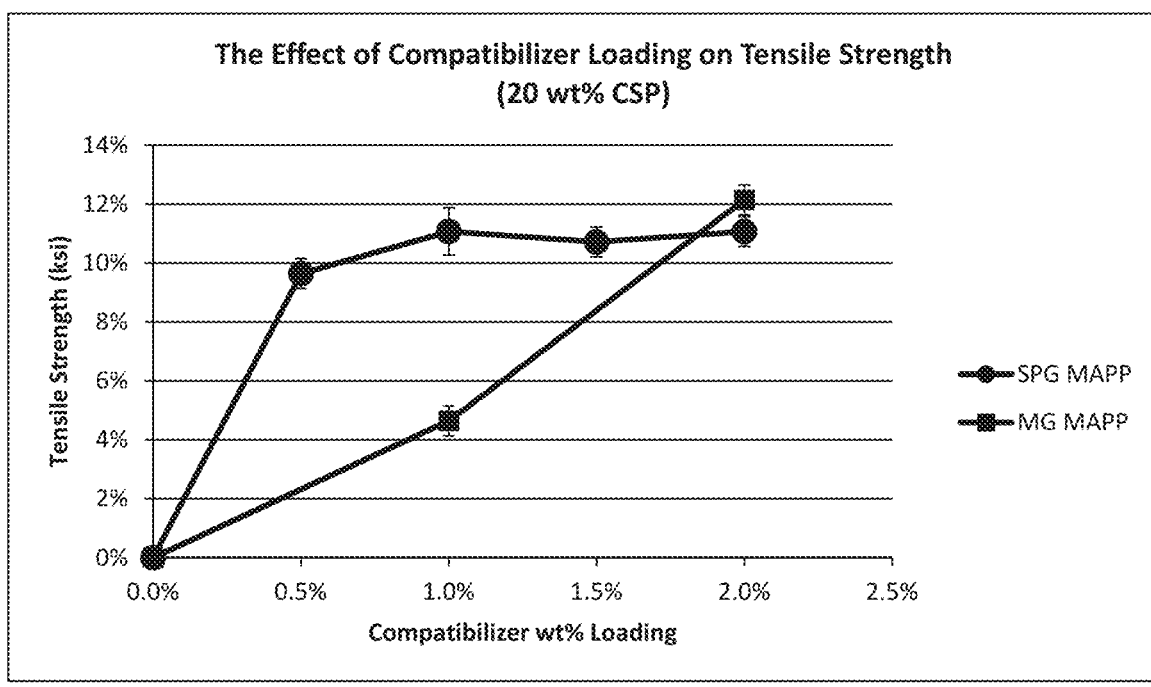
FIG. 10 shows a graph summarizing the effect of compatibilizer loading on tensile strength in accordance with the principles of the present invention.
Figure 11:
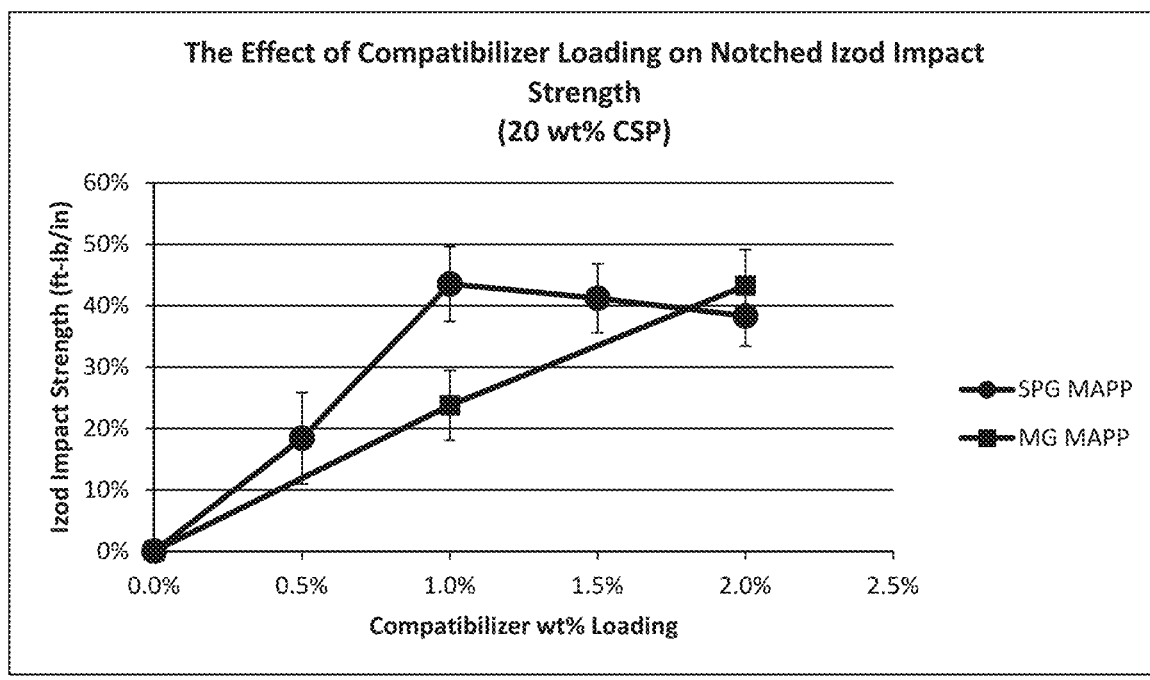
FIG. 11 shows a graph summarizing the effect of compatibilizer loading on impact strength in accordance with the principles of the present invention.
Figure 12:
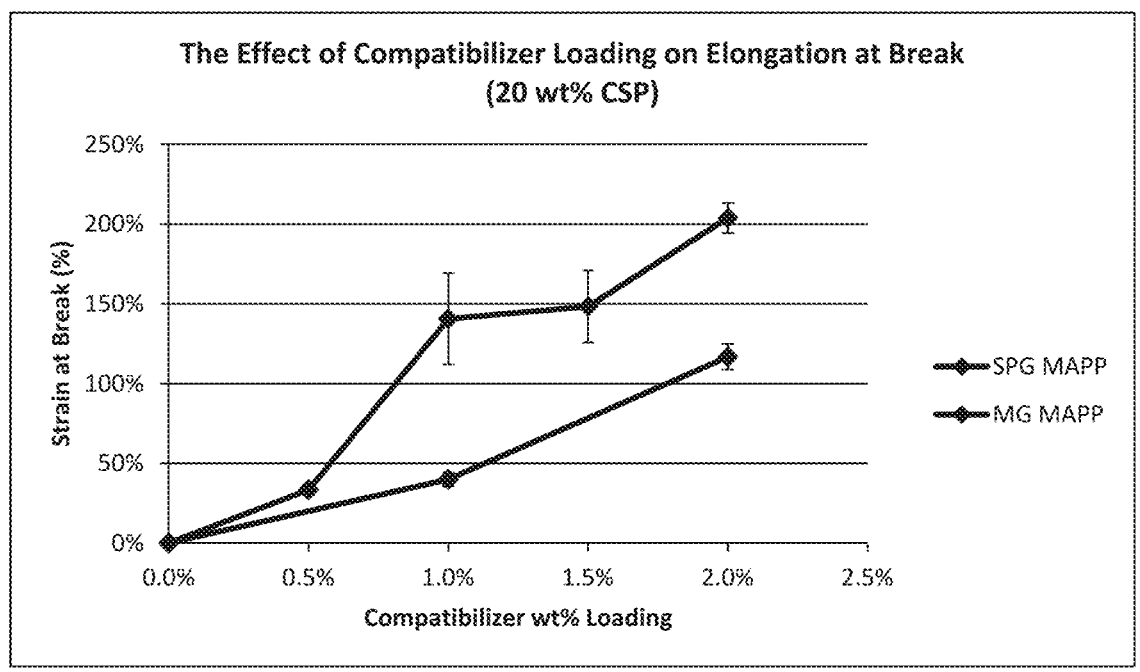
FIG. 12 shows a graph summarizing the effect of compatibilizer loading on elongation at break in accordance with the principles of the present invention.

In another example of this invention, utilizing strategic optimizing additives, in conjunction with the geometric synergy of high aspect ratio natural fibers and low aspect ratio CSP, has a further synergistic effect that can help to reduce costs, reduce VOC emissions and further improve composite processability. For example, the solid phase grafting process allows for greater amounts of maleic anhydride to be grafted onto a polypropylene backbone than the traditional melt grafting process allows for. Therefore, less solid phase grafted MAPP is needed to provide the same mechanical property improvements that melt grafted MAPP achieves at higher loadings. FIGS. 10, 11, and 12 compare the effects of solid phase grafted MAPP and melt grafted MAPP on the mechanical properties of low aspect ratio natural filler (CSP)-polypropylene composites. The mechanical properties that are examined are tensile strength (FIG. 10), notched Izod impact strength (FIG. 11), and elongation at break (FIG. 12). For all of the properties examined, adding 1 wt % solid phase grafted MAPP had an almost equivalent effect on mechanical properties as adding 2 wt % melt grafted MAPP. Thus, MAPP usage can be cut in half when switching from melt grafted MAPP to solid phase grafted MAPP. This represents a cost-save, as well as a reduction in unbound maleic anhydride and a slight reduction in VOCs in the end composite. Due to the solid phase grafting process occurring below the melting point of the polypropylene, the heat history of the polymer is reduced, thus reducing VOC emissions.

Figures 13, 14:
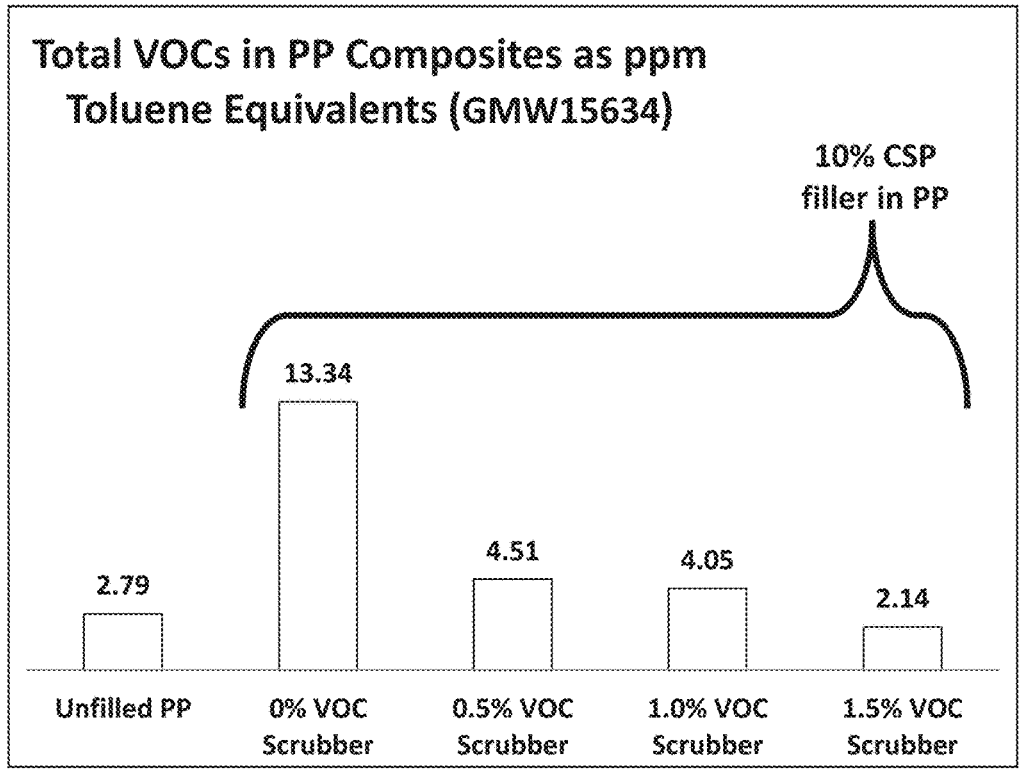
FIG. 13 shows a graph summarizing VOCs of composites in accordance with the principles of the present invention.
FIG. 14 shows a graph detailing odor test results for all conditions in accordance with the principles of the present invention.

Referring now to FIG. 13, customer complaints relating to odor coming from composite parts is often closely related to VOC emissions, which is a significant hurdle for many natural composite formulations. Typically, polymer processing temperatures are above the thermal degradation temperature of natural fillers. Thermal degradation is one source of VOCs and odor in a natural composite. Combine the VOCs/odor from thermal degradation to odor that stems from the moisture that is inherent in natural fillers and the composite will most likely be disqualified from interior automotive applications, interior building construction applications, and certain consumer goods. For a material to be used in an automotive interior application it must pass a specified "smell" or odor test. Passing this odor test has been a significant challenge for natural composites in the past, and odor has limited the applications available to natural composites. In order to compete with glass fiber composites in interior automotive applications, natural fiber composites must utilize strategic additives to reduce part odor. This research used a combination of scrubbing agents and studied the effects of different loadings on the reduction of VOCs and odor characteristics of natural composites.

FIG. 13 shows the effects of different weight percent loadings of scrubbing agent on the VOC emissions of 10 percent CSP-polypropylene composites as expressed in parts per million toluene equivalents. The introduction of the scrubbing agent to the 10 percent CSP-polypropylene composite drastically reduced the VOC emissions of the composite. The addition of 0.5, 1, and 1.5 wt % scrubbing agent yielded reductions in VOCs emissions of 66, 70, and 84 percent respectively. Using 1.5 wt % scrubbing agent reduced the VOC emissions to a level below the emissions recorded for unfilled polypropylene.

Using a VOC scrubbing agent helps to enable the natural fiber composite formulation to pass the Ford interior odor test: FLTM BO 131-03. In order to pass this particular test, certified "smellers" must give an average rating of 3 or below out of a 6 point scale in 0.5 increments (1 being "not perceptible", 3 being "clearly perceptible but not disturbing", and 6 being "extremely disturbing"). After identifying two natural fiber-CSP hybrid blended composite formulations that could compete with 20% short glass fiber, scrubbing agents were added to the formulation to reduce odor. The results of the FLTM BO 131-03 odor test on these two composite formulations can be seen below in FIG. 14. Reducing natural composite odor, opens up the door for several other applications in building construction and consumer goods that were once out of reach for most natural composite systems.

Therefore, the use of low aspect ratio natural fillers as a processing/dispersion aid and strategic optimizing additives, such as solid phase grafted MAPP and VOC scrubbing agents, allows for the necessary cost-cutting, mechanical property improving, and odor reducing of natural fiber composites to be technically and commercially competitive with glass fiber composites, especially short glass fiber composites. FIG. 15 shows two specific hybrid low-aspect ratio plus high-aspect ratio blended formulations that utilize these ingredients synergistically to meet the requirements for a 20% short glass fiber interior automotive material specification.

Referring now to FIG. 16, a process or method 80 for manufacturing the glass fiber replacement material is illustrated and will now be described. In a first step 82 of the process, the natural fiber and CSP are cleaned separately to prevent material contamination. A second step 84 includes chopping the natural fiber and milling the CSP separately to improve feeding into the polymer melt. A third step 86 dries the natural fiber and CSP to reduce moisture during subsequent process steps. A fourth step 88 compounds the natural fiber, CSP, strategic optimizing additives, and polymer resin via a twin screw extruder. For example, the extruder includes a screw having a diameter between 24 mm-230 mm and a length:diameter ratio between 46:1 and 110:1. Furthermore, the extruder is set to processing temperature setpoints between 185 and 20° C. The natural fiber, low aspect ratio natural filler, and polymer resin are loaded into separate Loss-in-Weight (LIW) feeders that provide a consistent material output in kg/hr, regardless of changes in the bulk density or packing density of the material in the feeder hopper. The strategic optimizing additives (solid phase grafted MAPP compatibilizer, VOC scrubber, etc.) are mixed together, based on their specified ratio in the formulation, and fed from a single LIW feeder. A fifth step 90 includes the injection molding of the final product using the compounded composite.

Figure 17A:
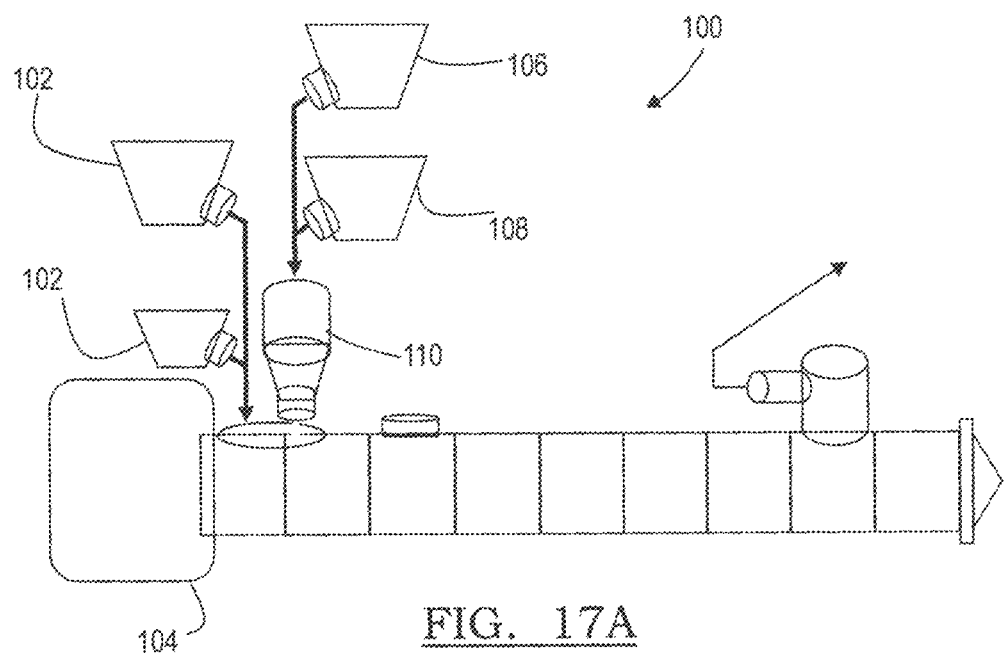
FIG. 17A is a schematic of a manufacturing process for making an a injection molded part in accordance with the principles of the present invention.
Figure 17B:
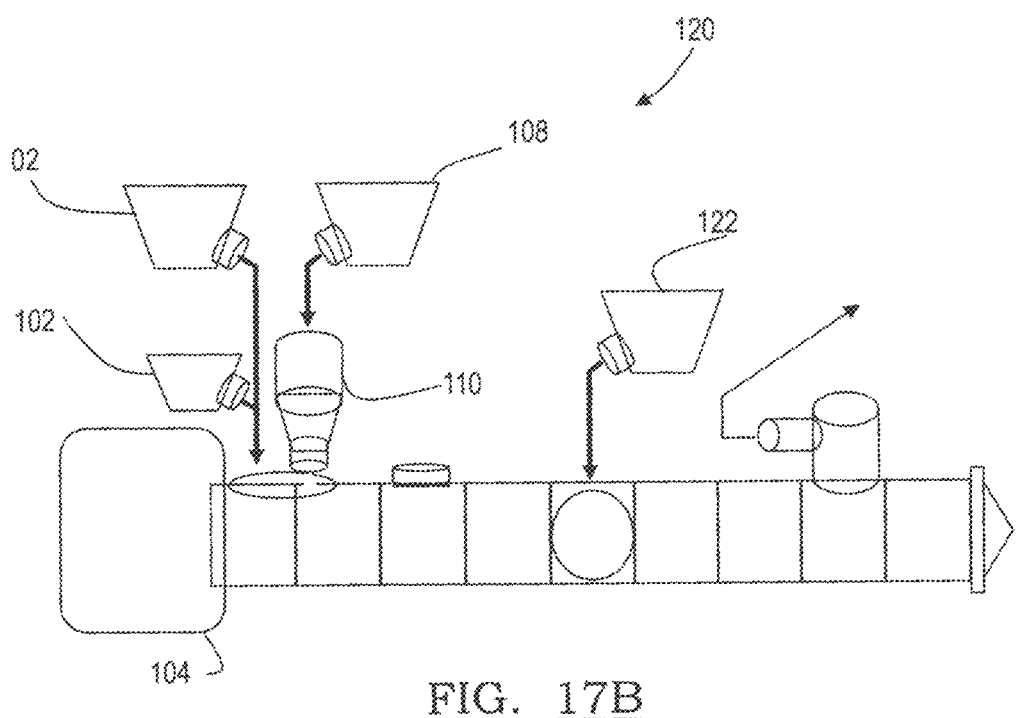
FIG. 17B is a schematic of a manufacturing process for making an injection molded part in accordance with the principles of the present invention.

The developed process configurations are shown in more detail in FIGS. 17A and 17B. However, the exemplary feeding configurations shown in FIGS. 17A and 17B are not meant to be exhaustive or limiting. Instead this graphic is meant to provide at least two examples of possible implementation of the above disclosed process that can be employed to compound the natural-based glass fiber replacement material.

A first manufacturing process 100 as shown in FIG. 17A involves the feeding of all of the constituents 102 of the composite upstream at the main extruder hopper 104. The natural fiber 106 and low aspect ratio natural filler 108 are fed into a secondary, specialty feeder 110 that mechanically mixes the fiber and particles together and provides a downward force to aid in the introduction of the material into the polymer melt. An alternative second manufacturing process 120 shown in FIG. 17B utilizes a downstream side feeder 122 to feed the low aspect ratio natural particles into the polymer melt. The advantage of feeding natural material downstream is that the heat history of the material is reduced due to less time in the barrel. Also, the introduction of hard second phase particles/fibers into the polymer melt is advantageous when introduced once the carrier resin is melted and flowing. The lower the viscosity of the melt upon filler introduction, the better the particle wetting of the polymer on the surface of the filler.

The description of the invention is merely exemplary in nature and variations that do not depart from the spirit of the invention are intended to be within the scope of the invention. Such variations are not to be regarded as a departure from the spirit and scope of the invention.

We claim:

1. A reinforced polymer composite, the reinforced polymer composite comprising:
   a polymer matrix;
   a strengthening agent, the strengthening agent including a natural fiber having a first aspect ratio;
   a dispersing agent, the dispersing agent including a coconut shell powder wherein the coconut shell powder has a low aspect ratio as compared to the first aspect ratio of the natural fiber; and
   a solid phase grafted MAPP in the amount up to 3.0 wt %, wherein the strengthening agent is homogenously dispersed in the polymer matrix.

2. The polymer composite material of claim 1, wherein the natural fiber is a bast fiber included in the reinforced polymer composite in an amount up to about 40.0 wt %.

3. The polymer composite material of claim 2, wherein the bast fiber is included in the amount of about 25.0 wt %.

4. The polymer composite material of claim 2, wherein the bast fiber is included in the amount of about 20.0 wt %.

5. The polymer composite material of claim 1, wherein the coconut shell powder is included in the reinforced polymer composite in the amount up to 10.0 wt %.

6. The polymer composite material of claim 5, wherein the coconut shell powder is included in the reinforced polymer composite in the amount of about 5.0 wt %.

7. The polymer composite material of claim 1, wherein the low aspect ratio of the coconut shell powder is between 1 and 3.

8. The polymer composite material of claim 1, wherein the first aspect ratio of the natural fiber is between 6 and 12.

9. The polymer composite material of claim 1, further including a scrubbing agent in the amount up to 2.0 wt %.

10. An injection molded reinforced polymer composite part, the reinforced polymer composite comprising:
a polymer matrix;
a strengthening agent, the strengthening agent including a natural fiber having a first aspect ratio in the amount up to 40.0 wt %;
a dispersing agent, the dispersing agent including a coconut shell powder in the amount up to 10.0 wt %, and wherein the coconut shell powder exhibits a low aspect ratio compared to the first aspect ratio;
a scrubbing agent in the amount up to 2.0 wt %, and
a solid phase grafted MAPP in the amount up to 2.0 wt %; and
wherein the strengthening agent is homogenously dispersed in the polymer matrix.

11. The polymer composite material of claim 10, wherein the natural fiber is a bast fiber included in the reinforced polymer composite in the amount of about 25.0 wt % and the coconut shell powder is included in the reinforced polymer composite in the amount of about 5.0 wt %.

12. The polymer composite material of claim 10, wherein the natural fiber is a bast fiber included in the amount of about 20.0 wt % and the coconut shell powder is included in the reinforced polymer composite in the amount of about 10.0 wt %.

13. The polymer composite material of claim 10, wherein the low aspect ratio of the coconut fiber is between 1 and 3.

14. The polymer composite material of claim 13, wherein the first aspect ratio is between 6 and 12.

15. A method for manufacturing a reinforced polymer composite part, the method including the steps of:
providing and cleaning a natural fiber strengthening agent having an aspect ratio between 6 and 12;
providing, milling, and cleaning a dispersing agent having an aspect ratio between 1 and 3;
drying the cleaned natural fiber strengthening agent and milled and cleaned dispersing agent;
providing and combining a polymer resin with the natural fiber strengthening agent, the dispersing agent, and a solid phase grafted MAPP in the amount up to 3.0 wt % in an extruder; and
injecting the combined polymer resin, natural fiber, and dispersing agent mixture into a die to form the part.

16. The method of claim 15, wherein the natural fiber strengthening agent is provided in the amount of about 25.0 wt % and the dispersing agent is provided in the amount of about 5.0 wt %.

17. The method of claim 15, wherein the natural fiber strengthening agent is provided in the amount of about 20.0 wt % and the dispersing agent is provided in the amount of about 10.0 wt %.

18. The method of claim 15, wherein the dispersing agent is a coconut shell powder, the coconut shell powder is provided in the amount between 5.0 wt % and 10.0 wt %, the natural fiber is a bast fiber, and the bast fiber is provided in the amount between 20.0 wt % and 25.0 wt %.

19. A reinforced polymer composite, the reinforced polymer composite comprising:
a polymer matrix;
a strengthening agent, the strengthening agent including a natural fiber having a first aspect ratio;
a dispersing agent, the dispersing agent including a coconut shell powder wherein the coconut shell powder has a low aspect ratio as compared to the first aspect ratio of the natural fiber; and
a scrubbing agent in the amount up to 2.0 wt. %,
wherein the strengthening agent is homogenously dispersed in the polymer matrix.

20. The reinforced polymer composite material of claim 19, wherein the natural fiber is a bast fiber included in the reinforced polymer composite in an amount up to about 40.0 wt %.

21. The polymer composite material of claim 20, wherein the bast fiber is included in the amount of about 25.0 wt %.

22. The polymer composite material of claim 20, wherein the bast fiber is included in the amount of about 20.0 wt %.

23. The reinforced polymer composite material of claim 19, wherein the coconut shell powder is included in the reinforced polymer composite in the amount up to 10.0 wt %.

24. The polymer composite material of claim 23, wherein the coconut shell powder is included in the reinforced polymer composite in the amount of about 5.0 wt %.

25. The reinforced polymer composite material of claim 19, wherein the low aspect ratio of the coconut shell powder is between 1 and 3.

26. The reinforced polymer composite material of claim 19, wherein the first aspect ratio of the natural fiber is between 6 and 12.

27. A method for manufacturing a reinforced polymer composite part, the method including the steps of:
providing and cleaning a natural fiber strengthening agent having an aspect ratio between 6 and 12;
providing, milling, and cleaning a dispersing agent having an aspect ratio between 1 and 3;
drying the cleaned natural fiber strengthening agent and milled and cleaned dispersing agent;
providing and combining a polymer resin with the natural fiber strengthening agent, the dispersing agent, and a scrubbing agent in an extruder, wherein the scrubbing agent is provided in an amount up to 2.0 wt. %; and
injecting the combined polymer resin, natural fiber, and dispersing agent mixture into a die to form the part.

28. The method of claim 27, wherein the natural fiber strengthening agent is provided in the amount of about 25.0 wt % and the dispersing agent is provided in the amount of about 5.0 wt %.

29. The method of claim 27, wherein the natural fiber strengthening agent is provided in the amount of about 20.0 wt % and the dispersing agent is provided in the amount of about 10.0 wt %.

30. The method of claim 27, wherein the dispersing agent is a coconut shell powder, the coconut shell powder is provided in the amount between 5.0 wt % and 10.0 wt %, the natural fiber is a bast fiber, and the bast fiber is provided in the amount between 20.0 wt % and 25.0 wt %.

* * * * *